(12) United States Patent
Wang et al.

(10) Patent No.: US 10,763,546 B2
(45) Date of Patent: Sep. 1, 2020

(54) ELECTROLYTE AND ELECTROCHEMICAL ENERGY STORAGE DEVICE

(71) Applicant: CONTEMPORARY AMPEREX TECHNOLOGY CO., LIMITED, Ningde (CN)

(72) Inventors: Xiaomei Wang, Ningde (CN); Bin Jiang, Ningde (CN); Chenghua Fu, Ningde (CN); Jiqiong Liu, Ningde (CN); Yan Zhou, Ningde (CN); Jianwei Zhu, Ningde (CN); Changlong Han, Ningde (CN); Wenhao Liu, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 37 days.

(21) Appl. No.: 16/027,000

(22) Filed: Jul. 3, 2018

(65) Prior Publication Data
US 2019/0036161 A1  Jan. 31, 2019

(30) Foreign Application Priority Data

Jul. 27, 2017  (CN) .......................... 2017 1 0624699

(51) Int. Cl.
| | | |
|---|---|---|
| *H01M 10/0565* | (2010.01) | |
| *H01M 10/0525* | (2010.01) | |
| *H01M 10/0569* | (2010.01) | |
| *H01M 10/0567* | (2010.01) | |
| *H01M 10/052* | (2010.01) | |
| *H01G 11/64* | (2013.01) | |
| *H01G 11/56* | (2013.01) | |
| *H01M 4/583* | (2010.01) | |
| *H01M 4/525* | (2010.01) | |
| *H01M 10/058* | (2010.01) | |
| *H01M 4/505* | (2010.01) | |
| *H01M 10/44* | (2006.01) | |
| *H01M 4/02* | (2006.01) | |
| *H01G 11/06* | (2013.01) | |

(52) U.S. Cl.
CPC ........ *H01M 10/0565* (2013.01); *H01G 11/56* (2013.01); *H01G 11/64* (2013.01); *H01M 4/505* (2013.01); *H01M 4/525* (2013.01); *H01M 4/583* (2013.01); *H01M 10/052* (2013.01); *H01M 10/058* (2013.01); *H01M 10/0525* (2013.01); *H01M 10/0567* (2013.01); *H01M 10/0569* (2013.01); *H01M 10/44* (2013.01); *H01G 11/06* (2013.01); *H01M 2004/027* (2013.01); *H01M 2004/028* (2013.01); *H01M 2300/0025* (2013.01); *H01M 2300/0082* (2013.01)

(58) Field of Classification Search
CPC ........ H01G 11/06; H01G 11/56; H01G 11/64; H01M 4/505; H01M 4/525; H01M 4/583; H01M 10/052; H01M 10/0525; H01M 10/0565; H01M 10/0567; H01M 10/0569; H01M 10/058; H01M 10/44; H01M 10/48; H01M 2004/027; H01M 2004/028; H01M 2300/0025; H01M 2300/0082
See application file for complete search history.

(56) References Cited

FOREIGN PATENT DOCUMENTS

| | | | |
|---|---|---|---|
| CN | 101667662 | A | 3/2010 |
| CN | 102306833 | * | 1/2012 |
| CN | 102456922 | A | 5/2012 |
| CN | 102417500 | A | 5/2014 |
| CN | 105845981 | A | 8/2016 |
| CN | 105932332 | A | 9/2016 |
| CN | 106099184 | A | 11/2016 |
| CN | 107293784 | * | 10/2017 |
| WO | WO 2013/026854 | A1 | 2/2013 |
| WO | WO 2015/150390 | A1 | 10/2015 |

OTHER PUBLICATIONS

Machine translation of CN102306833, published in Jan. 2012 (Year: 2012).*
Machine translation of the abstract of CN102306833, published in Jan. 2012 (Year: 2012).*
Machine translation of CN105845981, published in Aug. 2016 (Year: 2016).*
Machine translation of the abstract of CN105845981, published in Aug. 2016 (Year: 2016).*
Machine translation of CN107293784, published in Oct. 2017 (Year: 2017).*
Machine translation of the abstract of CN107293784, published in Oct. 2017 (Year: 2017).*

(Continued)

*Primary Examiner* — Anca Eoff
(74) *Attorney, Agent, or Firm* — Morgan, Lewis & Bockius LLP

(57) ABSTRACT

The present disclosure provides an electrolyte and an electrochemical energy storage device. The electrolyte comprises an electrolyte salt and an additive. The additive comprises a sulfonic ester cyclic quaternary ammonium salt and a fluorocarbon surfactant. Under the combined effect of the sulfonic ester cyclic quaternary ammonium salt and the fluorocarbon surfactant, a dense, uniform and stable passive film can form on a surface of each of a positive electrode film and a negative electrode film of the electrochemical energy storage device, and infiltration capability of the electrolyte on each of the passive film of the positive electrode film and the negative electrode film can be increased at the same time, so as to decrease electrode polarization inside the electrochemical energy storage device and make the electrochemical energy storage device have excellent rate capability, low temperature discharge performance and high temperature storage performance.

8 Claims, No Drawings

(56) References Cited

OTHER PUBLICATIONS

Jiang, L., Wang, Q., Li, K., Ping, P., Jiang, L., Sun, J.—A self-cooling and flame-retardant electrolyte for safer lithium ion batteries, Sustainable Energy & Fuels, 2018, 2, pp. 1323-1331 (Year: 2018).*
Machine translation of the description of CN 106099184A, published on Nov. 9, 2016 (Year: 2016).*
Contemporary Amperex Technology Co., Limited, Extended European Search Report, EP18185403.5 dated Dec. 11, 2018, 7 pgs.
Contemporary Amperex Technology Co., Limited, First Office Action, CN201710624699.2, dated Mar. 26, 2020, 9 pgs.

* cited by examiner

ELECTROLYTE AND ELECTROCHEMICAL ENERGY STORAGE DEVICE

CROSS-REFERENCE TO RELATED APPLICATIONS

The present application claims priority to Chinese patent application No. CN201710624699.2, filed on Jul. 27, 2017, which is incorporated herein by reference in its entirety.

FIELD OF THE PRESENT DISCLOSURE

The present disclosure relates to the field of energy storage device, and more specifically relates to an electrolyte and an electrochemical energy storage device.

BACKGROUND OF THE PRESENT DISCLOSURE

With the increasing depletion of fossil fuels and increasing pressure on environmental pollution, automotive industry urgently needs a new type energy resource to provide driving force for automobiles, and lithium-ion battery is talent showing itself due to its high energy density, no memory effect and high operating voltage, which makes the lithium-ion battery become a first choice for a power supply of the new energy vehicles at present. However, with the expansion of the market demand for electronic products and development of power device and energy storage device, people's demand for the lithium-ion battery is continuously increasing, developing high energy density and fast charge-discharge lithium-ion battery becomes an urgent matter. At present, an effective method is to increase voltage and press density of an electrode active material and select appropriate electrolyte.

At present, an electrolyte widely used in the lithium-ion battery comprises lithium hexafluorophosphate ($LiPF_6$) as an electrolyte salt and a mixture of cyclic carbonate ester and chain carbonate ester as an organic solvent, however the above electrolyte has many disadvantages, particularly under high voltage, high temperature storage performance of the lithium-ion battery is poor. The electrolyte, as an important part of the lithium-ion battery, has a significant influence on electrochemical performance of the lithium-ion battery. Therefore, how to further optimize the composition of the electrolyte is very important to improve performance of the lithium-ion battery.

SUMMARY OF THE PRESENT DISCLOSURE

In view of the problem existing in the background, an object of the present disclosure is to provide an electrolyte and an electrochemical energy storage device, the electrochemical energy storage device has excellent rate capability, low temperature discharge performance and high temperature storage performance.

In order to achieve the above object, in a first aspect of the present disclosure, the present disclosure provides an electrolyte, which comprises an electrolyte salt and an additive. The additive comprises a sulfonic ester cyclic quaternary ammonium salt and a fluorocarbon surfactant.

In a second aspect of the present disclosure, the present disclosure provides an electrochemical energy storage device, which comprises the electrolyte of the first aspect of the present disclosure.

Compared to the technology in the background, the present disclosure has the following beneficial effects: the additive of the electrolyte of the present disclosure comprises the sulfonic ester cyclic quaternary ammonium salt and the fluorocarbon surfactant, a dense, uniform and stable passive film can form on a surface of each of a positive electrode film and a negative electrode film of the electrochemical energy storage device under the combined effect of the sulfonic ester cyclic quaternary ammonium salt and the fluorocarbon surfactant, particularly a dense solid electrolyte interface film with low impedance can form on the surface of the negative electrode film, and infiltration capability of the electrolyte on the passive film of each of the positive electrode film and the negative electrode film can be increased at the same time, so as to decrease electrode polarization inside the electrochemical energy storage device and make the electrochemical energy storage device have excellent rate capability, low temperature discharge performance and high temperature storage performance.

DETAILED DESCRIPTION

Hereinafter an electrolyte and an electrochemical energy storage device according to the present disclosure will be described in detail.

Firstly, an electrolyte according to a first aspect of the present disclosure will be described.

The electrolyte according to the first aspect of the present disclosure comprises an electrolyte salt and an additive. The additive comprises a sulfonic ester cyclic quaternary ammonium salt and a fluorocarbon surfactant.

In the electrolyte according to the first aspect of the present disclosure, the electrolyte is a liquid electrolyte, a solid polymer electrolyte or a gel polymer electrolyte. Because the liquid electrolyte, the solid polymer electrolyte and the gel polymer electrolyte are similar in action mechanism, only the liquid electrolyte is taken as an example for description in the present disclosure, that is in the following description, the electrolytes all refer to the liquid electrolyte.

In the electrolyte according to the first aspect of the present disclosure, the sulfonic ester cyclic quaternary ammonium salt can form a dense and firm passive film on a surface of each of a positive electrode film and a negative electrode film of an electrochemical energy storage device, particularly a dense solid electrolyte interface film (SEI film) with low impedance can be formed on the surface of the negative electrode film, which can decrease the contact between the positive, negative electrode active materials of the positive, negative electrode films and the electrolyte, so as to prevent continuous oxidation and reduction reaction of the electrolyte from occurring on the surface of each of the positive electrode film and the negative electrode film, therefore decomposition of the electrolyte is weakened and increase of internal impedance is avoided, and high temperature storage performance of the electrochemical energy storage device is improved. The fluorocarbon surfactant can greatly increase infiltration capability of the electrolyte on the passive film of each of the positive electrode film and the negative electrode film of the electrochemical energy storage device, so as to decrease electrode polarization inside the electrochemical energy storage device and make the electrochemical energy storage device have excellent rate capability and low temperature discharge performance. Therefore, when the sulfonic ester cyclic quaternary ammonium salt and the fluorocarbon surfactant are added into the electrolyte at the same time, the electrochemical energy storage device has excellent rate capability, low temperature discharge performance and high temperature storage performance by the combined effect of the sulfonic ester cyclic quaternary ammonium salt and the fluorocarbon surfactant.

In the electrolyte of the first aspect of the present disclosure, the sulfonic ester cyclic quaternary ammonium salt is one or more selected from a group consisting of compound represented by formula 1; in the formula 1, $R_{11}$ is one selected from a group consisting of —CN, C1~C12 alkyl group, C1~C12 alkyl group substituted with a substituent, C2~C12 alkenyl group, C2~C12 alkenyl group substituted with the substituent, C2~C12 alkynyl group, C2~C12 alkynyl group substituted with the substituent, C1~C12 alkoxy group, C1~C12 alkoxy group substituted with the substituent, C1~C12 acyloxy group and C1~C12 acyloxy group substituted with the substituent; $R_{12}$ is one selected from a group consisting of C1~C12 alkylene group, C1~C12 alkylene group substituted with the substituent, C2~C12 alkenylene group, C2~C12 alkenylene group substituted with the substituent, C2~C12 alkynylene group, C2~C12 alkynylene group substituted with the substituent, C1~C12 alkylenoyl group and C1~C12 alkylenoyl group substituted with the substituent group; $R_{13}$ is one selected from a group consisting of C1~C12 alkyl group, C1~C12 alkyl group substituted with the substituent, C2~C12 alkenyl group, C2~C12 alkenyl group substituted with the substituent, C2~C12 alkynyl group, C2~C12 alkynyl group substituted with the substituent, C1~C12 alkoxy group, C1~C12 alkoxy group substituted with the substituent, C1~C12 acyloxy group, C1~C12 acyloxy group substituted with the substituent, C6~C22 aryl group, C6~C22 aryl group substituted with the substituent, C5~C22 heteroaryl group and C5~C22 heteroaryl group substituted with the substituent; $R_{14}$ is one selected from a group consisting of C1~C3 alkylene group and C1~C3 alkylene group substituted with the substituent; the substituent is one or more selected from a group consisting of —CN and halogen atom.

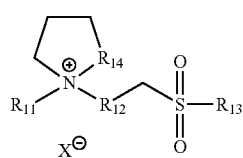

formula 1 in the formula 1, $X^{\ominus}$ represents an anion, $X^{\ominus}$ is one selected from a group consisting of $F^-$, $NO_3^-$, $SO_4^{2-}$, $PF_6^-$, $PF_4^-$, $AsF_6^-$, $(FSO_2)_2N^-$,

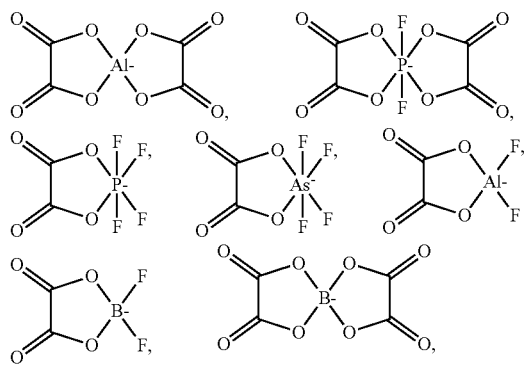

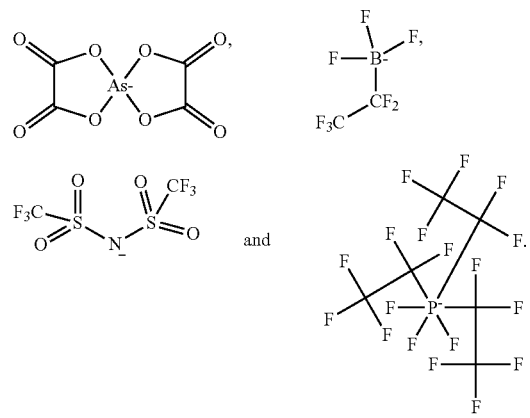

In the electrolyte of the first aspect of the present disclosure, in formula 1, preferably, $R_{11}$ is one selected from a group consisting of C1~C6 alkyl group, C1~C6 alkyl group substituted with the substituent, halogenated C1~C6 alkyl group and halogenated C1~C6 alkyl group substituted with the substituent, $R_{12}$ is one selected from a group consisting of C1~C12 alkylene group and C1~C12 alkylene group substituted with the substituent, $R_{13}$ is one selected from a group consisting of C1~C6 alkyl group, C1~C6 alkyl group substituted with the substituent, halogenated C1~C6 alkyl group and halogenated C1~C6 alkyl group substituted with the substituent, $R_{14}$ is one selected from a group consisting of C1~C2 alkylene group and C1~C2 alkylene group substituted with the substituent.

In the electrolyte of the first aspect of the present disclosure, a cationic group of the sulfonic ester cyclic quaternary ammonium salt is one selected from a group consisting of

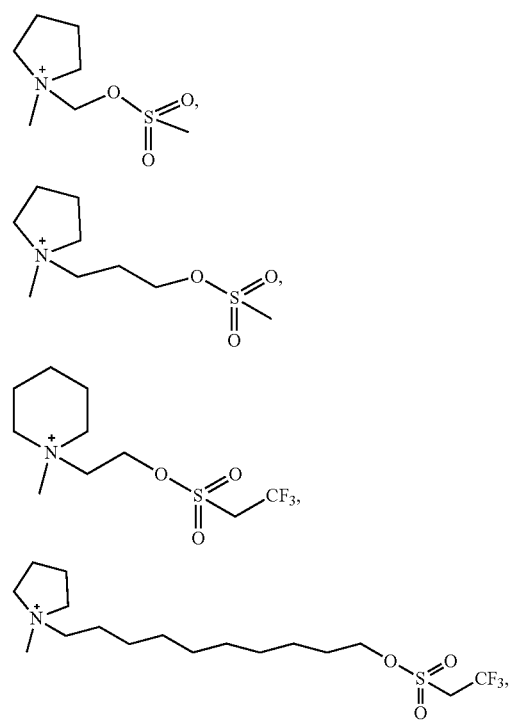

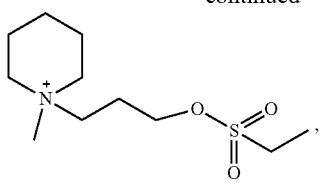
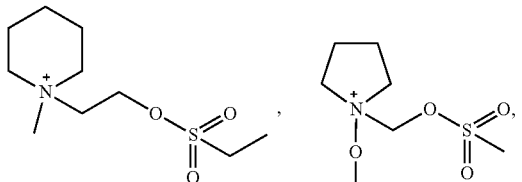
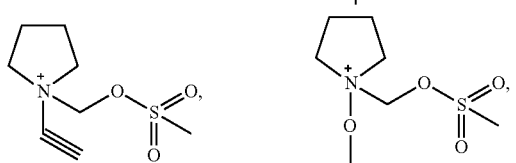
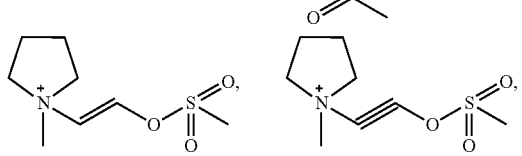
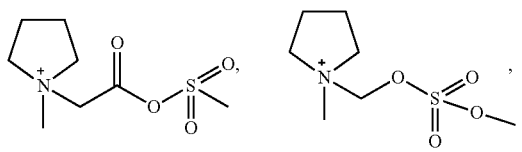
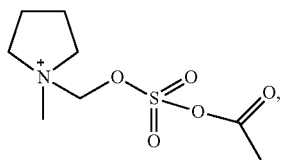
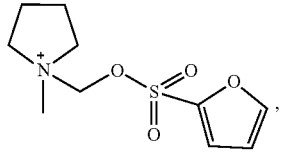
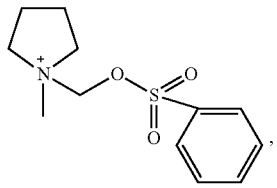
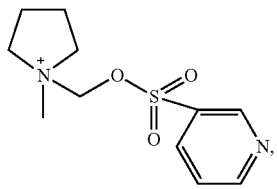
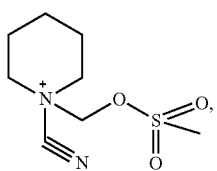
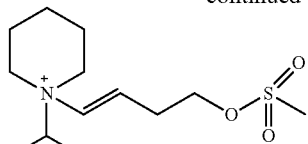 and
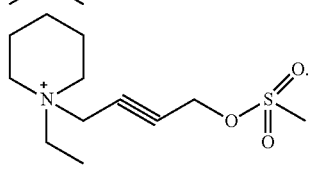
In the electrolyte of the first aspect of the present disclosure, the sulfonic ester cyclic quaternary ammonium salt is one or more selected from a group consisting of following compound, but the present disclosure is not limited to this;
compound 1-1
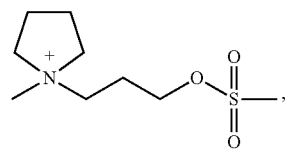
compound 1-2
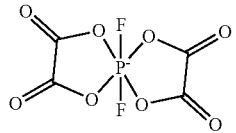
compound 1-3
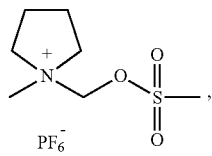
compound 1-4
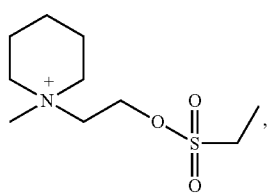
compound 1-4
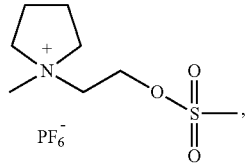
compound 1-5
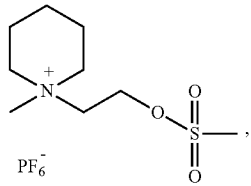

compound 1-6

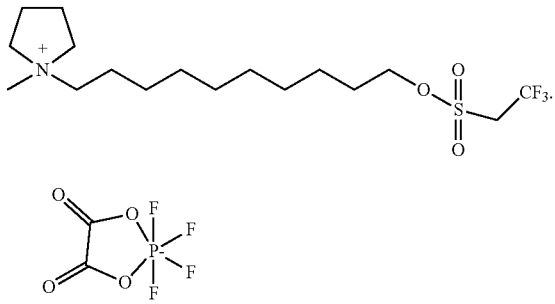

In the electrolyte of the first aspect of the present disclosure, the fluorocarbon surfactant is one or more selected from a group consisting of compound represented by formula 2; in the formula 2, x is an integer of 1~5, y is an integer of 1~10, $R_{21}$ is one selected from a group consisting of H, C1~C4 alkyl group, substituted C1~C4 alkyl group, C1~C4 alkoxy group and substituted C1~C4 alkoxy group.

$$C_2F_5(CF_2CF_2)_xCH_2CH_2O(CH_2CH_2O)_yR_{21} \quad \text{formula 2}$$

In the electrolyte of the first aspect of the present disclosure, preferably, x is an integer of 1~3.

In the electrolyte of the first aspect of the present disclosure, preferably, y is an integer of 2~5.

In the electrolyte of the first aspect of the present disclosure, preferably, $R_{21}$ is one selected from a group consisting of H, C1~C2 alkyl group, substituted C1~C2 alkyl group, C1~C2 alkoxy group and substituted C1~C2 alkoxy group.

In the electrolyte of the first aspect of the present disclosure, specifically, the fluorocarbon surfactant is one or more selected from a group consisting of $C_2F_5(CF_2CF_2)_2CH_2CH_2O(CH_2CH_2O)_2H$ (compound 2-1), $C_2F_5(CF_2CF_2)_1CH_2CH_2O(CH_2CH_2O)_{10}H$ (compound 2-2), $C_2F_5(CF_2CF_2)_1CH_2CH_2O(CH_2CH_2O)_{10}CH_3$ (compound 2-3), $C_2F_5(CF_2CF_2)_1CH_2CH_2O(CH_2CH_2O)_{10}CH_3$ (compound 2-4), and $C_2F_5(CF_2CF_2)_2CH_2CH_2O(CH_2CH_2O)_{10}OCH_2CH_3$ (compound 2-5).

In the electrolyte of the first aspect of the present disclosure, if a content of the sulfonic ester cyclic quaternary ammonium salt is too low, the passive film formed on the surface of the positive electrode film and the passive film formed on the surface of the negative electrode film are insufficient to prevent the electrolyte from further reacting and the improvement of performance of the electrochemical energy storage device is not obvious; if the content is too high, impedance of the passive film formed on the surface of the positive electrode film and impedance of the passive film formed on the surface of the negative electrode film will be increased, which will deteriorate performance of the electrochemical energy storage device. Preferably, the content of the sulfonic ester cyclic quaternary ammonium salt is 0.05%~10% of a total mass of the electrolyte. Further preferably, the content of the sulfonic ester cyclic quaternary ammonium salt is 0.1%~5% of the total mass of the electrolyte.

In the electrolyte of the first aspect of the present disclosure, if a content of the fluorocarbon surfactant is too low, improvements of rate capability and low temperature discharge performance of the electrochemical energy storage device under high voltage are not obvious; if the content of the fluorocarbon surfactant is too high, viscosity of the electrolyte will be too large, which will deteriorate dynamics performance of the electrochemical energy storage device. Preferably, the content of the fluorocarbon surfactant is 0.01%~1% of the total mass of the electrolyte. Further preferably, the content of the fluorocarbon surfactant is 0.05%~0.1% of the total mass of the electrolyte.

In the electrolyte of the first aspect of the present disclosure, a content of the electrolyte salt is 6%~25% of the total mass of the electrolyte, preferably, the content of the electrolyte salt is 6%~20% of the total mass of the electrolyte, further preferably, the content of the electrolyte salt is 10%~15% of the total mass of the electrolyte.

In the electrolyte of the first aspect of the present disclosure, the electrolyte salt of the electrolyte is selected from lithium salt or sodium salt.

In the electrolyte of the first aspect of the present disclosure, a type of the lithium salt is not particularly limited and may be selected according to actual demand. Preferably, the lithium salt at least comprises $LiPF_6$. The lithium salt may further comprise one or more selected from a group consisting of $LiBF_4$, $LiClO_4$, $LiAsF_6$, $LiSbF_6$, LiBOB, LiDFOB, $LiN(SO_2F)_2$, LiTFSI, $LiPO_2F_2$, LiTFOP, $LiN(SO_2RF)_2$ and $LiN(SO_2F)(SO_2RF)$, where $RF=CnF_{2n+1}$, that is RF represents saturated fluoroalkyl group, n is an integer of 1~10.

In the electrolyte of the first aspect of the present disclosure, a type of the sodium salt is not particularly limited and may be selected according to actual demand. Specifically, the sodium salt is one or more selected from a group consisting of $NaPF_6$, $NaBF_4$, $NaClO_4$, $NaAsF_6$, $NaCF_3SO_3$, $NaN(CF_3SO_2)_2$, $NaN(C_2F_5SO_2)_2$ and $NaN(FSO_2)_2$.

In the electrolyte of the first aspect of the present disclosure, the electrolyte may further comprise an organic solvent, a type of the organic solvent is not particularly limited and may be selected according to actual demand. Preferably, the organic solvent is non-aqueous organic solvent. The non-aqueous organic solvent may comprise any kind of carbonate and/or carboxylate. The carbonate may comprise cyclic carbonate ester or chain carbonate ester. The non-aqueous organic solvent may further comprise halogenated carbonate ester. Specifically, the organic solvent may be one or more selected from a group consisting of ethylene carbonate, propylene carbonate, butylene carbonate, pentylene carbonate, fluoroethylene carbonate, dimethyl carbonate, diethyl carbonate, dipropyl carbonate, ethyl methyl carbonate, methyl formate, ethyl formate, ethyl acetate, propyl propionate, ethyl propionate, γ-butyrolactone and tetrahydrofuran.

Next an electrochemical energy storage device according to a second aspect of the present disclosure is described.

The electrochemical energy storage device according to the second aspect of the present disclosure comprises the electrolyte according to the first aspect of the present disclosure.

In the electrochemical energy storage device according to the second aspect of the present disclosure, the electrochemical energy storage device comprises a positive electrode plate, a negative electrode plate, a separator and a package case.

In the electrochemical energy storage device according to the second aspect of the present disclosure, it should be noted that, the electrochemical energy storage device may be a lithium-ion battery, a sodium-ion battery, a zinc-ion battery or a supercapacitor. In examples of the present disclosure, a lithium-ion battery taken as an example of the electrochemical energy storage device is described, but the present disclosure is not limited to this.

In the lithium-ion battery, the positive electrode plate comprises a positive electrode current collector and a positive electrode film provided on the positive electrode current collector. The positive electrode film comprises a positive electrode active material, the positive electrode film further comprises a conductive agent and a binder. The positive electrode active material may be one or more selected from a group consisting of lithium cobalt oxide ($LiCoO_2$), lithium nickel oxide ($LiNiO_2$), spinel-type lithium manganese dioxide ($LiMn_2O_4$), olivine-type $LiMPO_4$ and $Li_aNi_xA_yB_{(1-x-y)}O_2$. Wherein, in the olivine-type $LiMPO_4$, M is one or more selected from a group consisting of Co, Ni, Fe, Mn and V; in the $Li_aNi_xA_yB_{(1-x-y)}O_2$, A and B each independently are one selected from a group consisting of Co, Al and Mn, and A and B is different, $0.95 \leq a \leq 1.2$, $0 < x < 1$, $0 < y < 1$, and $x+y<1$. A type of the conductive agent and the binder is not particularly limited and may be selected according to actual demand.

In the lithium-ion battery, the negative electrode plate comprises a negative electrode current collector and a negative electrode film provided on negative electrode current collector. The negative electrode film comprises a negative electrode active material, the negative electrode film further comprises a conductive agent and a binder. The negative electrode active material may be selected from materials that lithiumion can be intercalated under voltage less then 2V (vs. Li/Li⁻). Specifically, the negative electrode active material may be one or more selected from a group consisting of natural graphite, artificial graphite, mesocarbon microbead (abbreviated as MCMB), hard carbon, soft carbon, silicon, silicon-carbon composite, Li—Sn alloy, Li—Sn—O alloy, Sn, SnO, $SnO_2$, spinel-type lithiation $TiO_2$—$Li_4Ti_5O_{12}$ and Li—Al alloy. A type of the conductive agent and the binder is not particularly limited and may be selected according to actual demand. The negative electrode plate can also directly use a lithium metal plate.

In the lithium-ion battery, a type of the separator is not particularly limited and may be selected according to actual demand, specifically, the separator may be selected from a polyethylene film, a polypropylene film, a polyvinylidene fluoride film and a multilayer composite films thereof.

Hereinafter the present disclosure will be described in detail in combination with examples. It should be noted that, the examples described in the present disclosure are only used for explaining the present disclosure, and are not intended to limit the present disclosure. In the examples, a lithium-ion battery taken as an example of the electrochemical energy storage device is described, but the present disclosure is not limited to this.

In the following example, the reagents, materials and instruments used are commercially available unless otherwise specified. The sulfonic ester cyclic quaternary ammonium salt used may refer to Chinese patent application publication No. CN105845981A published in Aug. 10, 2016.

The lithium-ion batteries of examples 1~10 and comparative examples 1~7 were all prepared as follows:

(1) Preparation of a positive electrode plate: lithium cobalt oxide (positive electrode active material, $LiCoO_2$), acetylene black (conductive agent), polyvinylidene fluoride (binder) according to a mass ratio of 98:1:1 were mixed with N-methyl-2-pyrrolidone (solvent) under vacuum mixer to form a stable and uniform positive electrode slurry; then the positive electrode slurry was uniformly coated on an aluminum foil (positive electrode current collector) with a thickness of 12 μm; drying under room temperature was then performed, which was followed by moving the aluminum foil to an oven for baking 1 h under 120° C., then after cold-pressing and slitting, the positive electrode plate was obtained.

(2) Preparation of a negative electrode plate: artificial graphite (negative electrode active material), sodium carboxymethylcellulose (thickening agent, CMC), styrene butadiene rubber (binder) according to a mass ratio of 98:1:1 was mixed with deionized water under vacuum mixer to form a negative electrode slurry; then the negative electrode slurry was uniformly coated on a copper foil (negative electrode current collector) with a thickness of 8 μm; drying under room temperature was then performed, which was followed by moving the copper foil to an oven for baking 1 h under 120° C., then after cold-pressing and slitting, the negative electrode plate was obtained.

(3) Preparation of an electrolyte: in an argon atmosphere glove box in which the water content was less than 10 ppm, ethylene carbonate (EC), propylene carbonate(PC), diethyl carbonate (DEC) according to a volume ratio of EC:PC:DEC=1:1:1 were mixed as a mixed organic solvent, then fully dried lithium salt $LiPF_6$ was dissolved into the mixed organic solvent, next the sulfonic ester cyclic quaternary ammonium salt and the fluorocarbon surfactant were added, after uniformly mixing, the electrolyte was obtained. Here, a content of $LiPF_6$ was 12.5% of the total mass of the electrolyte. The types and the contents of the sulfonic ester cyclic quaternary ammonium salt and the fluorocarbon surfactant of the electrolyte were shown in table 1, and in table 1, the content of the sulfonic ester cyclic quaternary ammonium salt and the content of the fluorocarbon surfactant were mass percent based on the total mass of the electrolyte.

(4) Preparation of a separator: a polypropylene separator with a thickness of 16 μm (model A273, provided by Celgard Company) was used as the separator.

(5) Preparation of a lithium-ion battery: the positive electrode plate, the separator, the negative electrode plate were laminated in order so as to make the separator positioned between the positive electrode plate and the negative electrode plate and separate the positive electrode plate and the negative electrode plate, then were wound to form an electrode assembly and placed in a package case, next the prepared electrolyte was injected into the dried electrode assembly, after vacuum packaging, standing-by, forming, shaping and the like, the lithium-ion battery was obtained.

TABLE 1

Parameters of examples 1~10 and comparative examples 1~7

| | Sulfonic ester cyclic quaternary ammonium salt | | Fluorocarbon surfactant | |
|---|---|---|---|---|
| | Type | Content/% | Type | Content/% |
| Example 1 | Compound 1-1 | 0.05 | Compound 2-1 | 0.1 |
| Example 2 | Compound 1-1 | 0.1 | Compound 2-1 | 0.1 |
| Example 3 | Compound 1-1 | 5 | Compound 2-1 | 0.1 |
| Example 4 | Compound 1-1 | 10 | Compound 2-1 | 0.1 |
| Example 5 | Compound 1-1 | 1 | Compound 2-1 | 0.01 |
| Example 6 | Compound 1-1 | 1 | Compound 2-1 | 0.05 |
| Example 7 | Compound 1-1 | 1 | Compound 2-1 | 0.1 |
| Example 8 | Compound 1-1 | 1 | Compound 2-1 | 1 |
| Example 9 | Compound 1-3 | 1 | Compound 2-1 | 0.1 |
| Example 10 | Compound 1-3 | 1 | Compound 2-2 | 0.1 |
| Comparative example 1 | — | — | — | — |
| Comparative example 2 | Compound 1-1 | 1 | — | — |
| Comparative example 3 | — | — | Compound 2-1 | 0.1 |

TABLE 1-continued

Parameters of examples 1~10 and comparative examples 1~7

| | Sulfonic ester cyclic quaternary ammonium salt | | Fluorocarbon surfactant | |
|---|---|---|---|---|
| | Type | Content/% | Type | Content/% |
| Comparative example 4 | Compound 1-1 | 0.03 | Compound 2-1 | 0.1 |
| Comparative example 5 | Compound 1-1 | 11 | Compound 2-1 | 0.1 |
| Comparative example 6 | Compound 1-1 | 1 | Compound 2-1 | 0.005 |
| Comparative example 7 | Compound 1-1 | 1 | Compound 2-1 | 2 |

Finally, test processes and test results of the lithium-ion batteries were described.

(1) Testing of Low Temperature Discharge Performance of the Lithium-Ion Battery

At 25° C., the lithium-ion battery was charged to a voltage of 4.4V at a constant current of 0.5C, then the lithium-ion battery was charged to a current not more than 0.05C at a constant voltage of 4.4V, after standing-by for 10 min, the lithium-ion battery was discharged to a cut-off voltage of 3.0V at a constant current of 0.5C, discharge capacity of the lithium-ion battery this moment was tested and marked as C0; then the lithium-ion battery was charged to a voltage of 4.4V at a constant current of 0.5C, next the lithium-ion battery was charged to a current not more than 0.05C at a constant voltage of 4.4V, after standing-by for 10 min, the lithium-ion battery was stored in a −10° C. thermostat under −10° C. for 2 h, then the lithium-ion battery was discharged to a cutoff voltage of 3.0V at a constant current of 0.5C, discharge capacity of the lithium-ion battery this moment was tested and marked as C1. Fifteen lithium-ion batteries were tested in each group to take an average value.

Discharge capacity retention rate of the lithium-ion battery after stored under −10° C. for 2 h (%)=C1/C0×100%.

(2) Testing of Rate Capability of the Lithium-Ion Battery

At 25° C., the lithium-ion battery was charged to a voltage of 4.4V at a constant current of 1C (nominal capacity), then the lithium-ion battery was charged to a current not more than 0.05C at a constant voltage of 4.4V, after standing-by for 5 min, the lithium-ion battery was discharged to a cutoff voltage of 3V at a constant current of 0.2C, discharge capacity of the lithium-ion battery was marked as D0, then the lithium-ion battery was charged to a voltage of 4.4V at a constant current of 1C, next the lithium-ion battery was charged to a current not more than 0.05C at a constant voltage of 4.4V, finally the lithium-ion battery was discharged to a cutoff voltage of 3V at a constant current of 5C, actual discharge capacity of the lithium-ion battery this moment as marked as D1. Fifteen lithium-ion batteries were tested in each group to take an average value.

Rate capability of the lithium-ion battery of 5C/0.2C (%)=[D1/D0]×100%.

(3) Testing of High Temperature Storage Performance of the Lithium-Ion Battery

At 25° C., the lithium-ion battery was charged to 4.4V at a constant current of 1C, then the lithium-ion battery was charged to a current less than 0.05C at a constant voltage of 4.4V, next the lithium-ion battery was discharged to 3.0V at a constant current of 0.5C; then the lithium-ion battery was charged to 4.4V at a constant current of 1C, next the lithium-ion battery was charged to a current less than 0.05C at a constant voltage of 4.4V, discharge capacity of the lithium-ion battery this moment was tested and marked as Q0; then the lithium-ion battery was stored under 60° C. for 30 days, then the lithium-ion battery was discharged to 3.0V at a constant current of 1C; then the lithium-ion battery was charged to 4.4V at a constant current of 1C, next the lithium-ion battery was charged to a current less than 0.05 at a constant voltage of 4.4V, after that, the lithium-ion battery was discharged to 3.0V at a constant current of 0.5C, discharge capacity of the lithium-ion battery this moment was tested and marked as Q1. Fifteen lithium-ion batteries were tested in each group to take an average value.

Capacity retention rate of the lithium-ion battery after stored under 60° C. for 30 days (%)=[Q1/Q0]×100%.

TABLE 2

Test results of examples 1~10 and comparative examples 1~7

| | Rate capability of 5 C/0.2 C (%) | Discharge capacity retention rate after stored under −10° C. for 2 h (%) | Capacity retention rate after stored under 60° C. for 30 days (%) |
|---|---|---|---|
| Example 1 | 70.7 | 67.7 | 54.7 |
| Example 2 | 70.5 | 67.6 | 58.3 |
| Example 3 | 70.0 | 66.8 | 86.0 |
| Example 4 | 67.4 | 63.4 | 84.1 |
| Example 5 | 70.5 | 66.9 | 77.5 |
| Example 6 | 76.5 | 69.3 | 77.9 |
| Example 7 | 81.9 | 74.1 | 77.7 |
| Example 8 | 78.3 | 71.0 | 78.0 |
| Example 9 | 81.0 | 73.5 | 77.0 |
| Example 10 | 81.1 | 72.7 | 84.3 |
| Comparative example 1 | 61.4 | 57.9 | 51.1 |
| Comparative example 2 | 61.5 | 57.8 | 77.0 |
| Comparative example 3 | 70.8 | 67.4 | 51.3 |
| Comparative example 4 | 70.8 | 67.3 | 51.4 |
| Comparative example 5 | 59.8 | 55.4 | 71.1 |
| Comparative example 6 | 61.6 | 58.0 | 76.9 |
| Comparative example 7 | 59.8 | 56.2 | 77.1 |

It could be seen from related data in table 2, the lithium-ion battery had excellent rate capability, low temperature discharge performance and high temperature storage performance under the combined effect of the sulfonic ester cyclic quaternary ammonium salt and the fluorocarbon surfactant.

In comparative examples 1~3, the sulfonic ester cyclic quaternary ammonium salt and the fluorocarbon surfactant were not added into comparative example 1, rate capability, low temperature discharge performance and high temperature storage performance of the lithium-ion battery were all poor; when only the sulfonic ester cyclic quaternary ammonium salt (comparative example 2) was added into the electrolyte, high temperature storage performance of the lithium-ion battery was better improved, but rate capability and low temperature discharge performance were not improved obviously; when only the fluorocarbon surfactant (comparative example 3) was added into the electrolyte, dynamics performance of the lithium-ion battery was improved, so as to make the lithium-ion battery have better rate capability and low temperature discharge performance, but high temperature storage performance of the lithium-ion battery was not obviously improved, and even slightly deteriorated.

In examples 1~10 and comparative examples 4~7, the sulfonic ester cyclic quaternary ammonium salt and the fluorocarbon surfactant were added into the electrolyte at the same time, the lithium-ion battery had excellent rate capability, low temperature discharge performance and high temperature storage performance, this was because the sulfonic ester cyclic quaternary ammonium salt and fluorocarbon surfactant could form a dense, uniform and stable passive film on the surface of each of the positive electrode film and the negative electrode film, particularly a dense solid electrolyte interface film with low impedance could be formed on the surface of the negative electrode film, which could prevent continuous oxidation and reduction reaction between the electrolyte and the positive, negative electrode active materials of the positive, negative electrode films from occurring, and could increase infiltration capability of the electrolyte on the passive film of each of the positive electrode film and the negative electrode film, so as to make the lithium-ion battery have excellent rate capability, low temperature discharge performance and high temperature storage performance. It could be understood at the same time, changes of the specific type and content of the sulfonic ester cyclic quaternary ammonium salt and the fluorocarbon surfactant would directly affect performance of the electrolyte, thereby would influence improvement effects of performance of the lithium-ion battery.

In comparative example 4, the content of the sulfonic ester cyclic quaternary ammonium salt was insufficient, improvement of high temperature storage performance of the lithium-ion battery was not obvious. In examples 1~4, as the content of the sulfonic ester cyclic quaternary ammonium salt increased, high temperature storage performance of the lithium-ion battery could be obviously improved, but rate capability and low temperature discharge performance of the lithium-ion battery were slightly deteriorated. When the content of the sulfonic ester cyclic quaternary ammonium salt was too high, for example in comparative example 5, rate capability, low temperature discharge performance and high temperature storage performance of the lithium-ion battery were significantly deteriorated.

In comparative example 6, the content of the fluorocarbon surfactant was insufficient, the improvement of rate capability and low temperature discharge performance of the lithium-ion battery were weakened. In examples 5~8, as the content of the fluorocarbon surfactant increased, rate capability and low temperature discharge performance of the lithium-ion battery were improved under the case that high temperature storage capacity retention rate of the lithium-ion battery is obviously deteriorated. When the content of the fluorocarbon surfactant was too high, for example in comparative example 7, due to the increase of viscosity of the electrolyte, dynamics performance of the lithium-ion battery got worse, rate capability and low temperature discharge performance of the lithium-ion battery were deteriorated, and high temperature storage performance of the lithium-ion battery was deteriorated at the same time.

Therefore, too low or too high content of the sulfonic ester cyclic quaternary ammonium salt and too low or too high content of the fluorocarbon surfactant were both beneficial to improve performance of the lithium-ion battery, but for some non-high requirements, they could also improve rate capability, low temperature discharge performance and high temperature storage performance of the lithium-ion battery to a certain extent.

According to the revelations of the present disclosure, a person skilled in the art may also make appropriate variations and modifications to the above embodiments. Therefore, the present disclosure is not limited to the specific embodiments disclosed and described in the above, modifications and variations of the present disclosure will also be fallen within the scope of the appended claims of the present disclosure.

What is claimed:

1. An electrolyte, comprising:
an electrolyte salt; and
an additive;
wherein the additive comprises a sulfonic ester cyclic quaternary ammonium salt and a fluorocarbon surfactant;
the sulfonic ester cyclic quaternary ammonium salt is

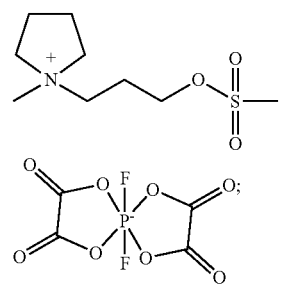

the fluorocarbon surfactant is $C_2F_5(CF_2CF_2)_2CH_2CH_2O(CH_2CH_2O)_2H$ or $C_2F_5(CF_2CF_2)_1CH_2CH_2O(CH_2CH_2O)_{10}H$.

2. The electrolyte according to claim 1, wherein
a content of the sulfonic ester cyclic quaternary ammonium salt is 0.05%~10% of a total mass of the electrolyte;
a content of the fluorocarbon surfactant is 0.01%~1% of the total mass of the electrolyte.

3. The electrolyte according to claim 2, wherein
the content of the sulfonic ester cyclic quaternary ammonium salt is 0.1%~5% of the total mass of the electrolyte;
the content of the fluorocarbon surfactant is 0.05%~0.1% of the total mass of the electrolyte.

4. The electrolyte according to claim 1, wherein the electrolyte is a liquid electrolyte, a solid polymer electrolyte or a gel polymer electrolyte.

5. An electrochemical energy storage device, comprising an electrolyte;
the electrolyte comprising an electrolyte salt and an additive;
wherein the additive comprises a sulfonic ester cyclic quaternary ammonium salt and a fluorocarbon surfactant;
the sulfonic ester cyclic quaternary ammonium salt is

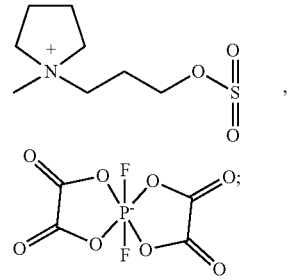

the fluorocarbon surfactant is $C_2F_5(CF_2CF_2)_2CH_2CH_2O(CH_2CH_2O)_2H$ or $C_2F_5(CF_2CF_2)_1CH_2CH_2O(CH_2CH_2O)_{10}H$.

6. The electrochemical energy storage device according to claim 5, wherein
   a content of the sulfonic ester cyclic quaternary ammonium salt is 0.05%~10% of a total mass of the electrolyte;
   a content of the fluorocarbon surfactant is 0.01%~1% of the total mass of the electrolyte.

7. The electrochemical energy storage device according to claim 6, wherein
   the content of the sulfonic ester cyclic quaternary ammonium salt is 0.1%~5% of the total mass of the electrolyte;
   the content of the fluorocarbon surfactant is 0.05%~0.1% of the total mass of the electrolyte.

8. The electrochemical energy storage device according to claim 5, wherein the electrolyte is a liquid electrolyte, a solid polymer electrolyte or a gel polymer electrolyte.

* * * * *